United States Patent
Wada et al.

[15] 3,698,138
[45] Oct. 17, 1972

[54] GRINDING MACHINE WITH ADAPTIVE CONTROL SYSTEM

[72] Inventors: Ryuzi Wada; Keiichi Nakamura, both of Kariya; Kimio Kanou, Aichi-ken, all of Japan

[73] Assignee: Toyoda Koki Kabushiki Kaisha

[22] Filed: Aug. 10, 1970

[21] Appl. No.: 62,300

[30] Foreign Application Priority Data

Aug. 13, 1969 Japan..................44/64373

[52] U.S. Cl..............................51/165.8, 51/165 TP
[51] Int. Cl. ........................................B24b 49/04
[58] Field of Search..........51/165 R, 165 TP, 165.71, 165.77, 51/165.8, 165.9, 165.91, 165.92; 318/569, 571, 592, 593, 603, 604

[56] References Cited

UNITED STATES PATENTS

| | | | |
|---|---|---|---|
| 2,961,808 | 11/1960 | Dunigan | 51/165.92 |
| 3,056,240 | 10/1962 | Morgan et al. | 51/165 TP |
| 3,344,559 | 10/1967 | Inaba et al. | 51/165 TP X |
| 3,353,302 | 11/1967 | Lowy | 51/49 |
| 3,541,417 | 11/1970 | Frank | 318/571 |
| 3,568,372 | 3/1971 | Asano et al. | 51/165 R |

*Primary Examiner*—Lester M. Swingle
*Attorney*—Blum, Moscovitz, Friedman & Kaplan

[57] ABSTRACT

A grinding machine operative for controlling the feeding speed of a wheel slide to obtain high machining accuracy and efficiency, incorporating a sizing device for constantly measuring the diameter of a workpiece during a grinding operation thereon and directs feed control means to change the feed speed of the wheel slide. A grinding resistance control means is provided for detecting the grinding resistance applied on the grinding wheel and supplies the feed control means with the detected grinding resistance in a rough grinding stage at a predetermined value. For the final grinding operation, the axis of a wheel spindle carrying the grinding wheel is shifted to obtain a required diameter of the workpiece.

22 Claims, 15 Drawing Figures

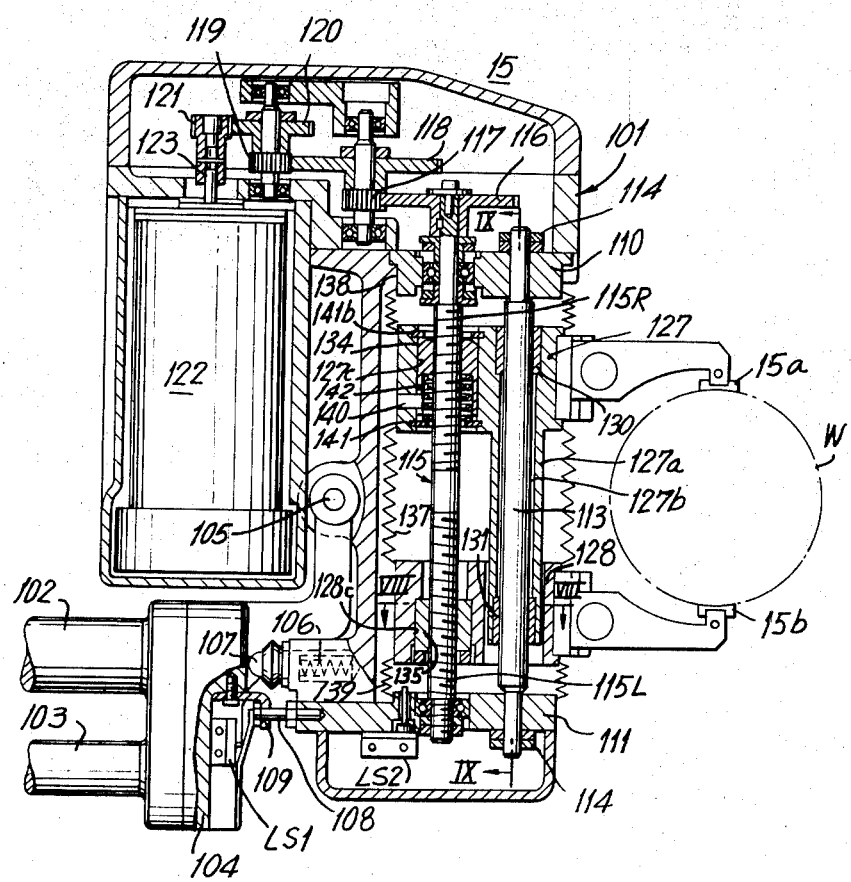

3,698,138

GRINDING MACHINE WITH ADAPTIVE CONTROL SYSTEM

BACKGROUND OF THE INVENTION

The present invention is related to grinding machines and more particularly to a grinding machine, wherein the feeding speed of a wheel slide is automatically controlled to make it suitable for a continuously changing grinding condition.

During grinding operations, a grinding condition is continuously varied depending upon the change of the surface condition of the grinding wheel, the reduction of the grinding wheel diameter, the diameter of a workpiece and the thermal deformation of members composing a grinding machine and elements thereof.

Up to now considerable progress has been obtained in the field of a high speed grinding operation, wherein the time consumed in grinding operation has been reduced by increasing the surface speed of the grinding wheel whereby a large amount of the workpiece is ground off. However, the merits derived from the high speed grinding operation are not fully obtained, unless the movement of the wheel slide is controlled in accordance with the continuously changing grinding condition, since the grinding condition is considerably changed during the high speed grinding operation.

SUMMARY OF THE INVENTION

It is, therefore, an object of the present invention to provide a grinding machine which effectuates the grinding operation on a workpiece in accordance with the diameter of the workpiece and the grinding resistance applied to the grinding wheel thereof.

Another object of the invention is to provide a grinding machine which is capable of controlling the position where the feed speed of a wheel slide is changed from high speed to a slower rough grinding speed thereby to reduce idle grinding time.

Still another object of the present invention is to provide a grinding machine which is provided with a grinding resistance control for detecting the grinding resistance applied to a grinding wheel in accordance with pressure differentials produced at the pressure pockets on the bearings carrying a wheel spindle.

A further object of this invention is to provide a grinding machine which is equipped with a sizing device which is applicable to a wide range of workpiece diameters and may detect the absolute value thereof.

According to this present invention, the feed rate of a wheel slide is controlled in accordance with measurement on a workpiece diameter so that the grinding wheel does not collide against the workpiece at high speed of the wheel slide, and the grinding resistance applied on the grinding wheel in a rough grinding operation is maintained at a predetermined value so as to promote the machining efficiency. In the fine grinding operation, any undesirable surface on the workpiece due to the grinding operation is effectively removed. Furthermore, in a final grinding operation, the axis of a wheel spindle is operably shifted to advance the grinding wheel toward the workpiece by the pressure differential produced in pressure pockets on the bearings which rotatably support the wheel spindle. Thus, high machining accuracy and efficiency are developed.

BRIEF DESCRIPTION OF THE DRAWINGS

The foregoing and other objects of the invention, which will become more fully apparent from the following detailed description, may be achieved by the exemplifying apparatus depicted and set forth in the specification in connection with the accompanying drawings, in which:

FIG. 7 is a sectional view of a sizing device according to the present invention;

DETAILED DESCRIPTION OF THE INVENTION

Figure 1:
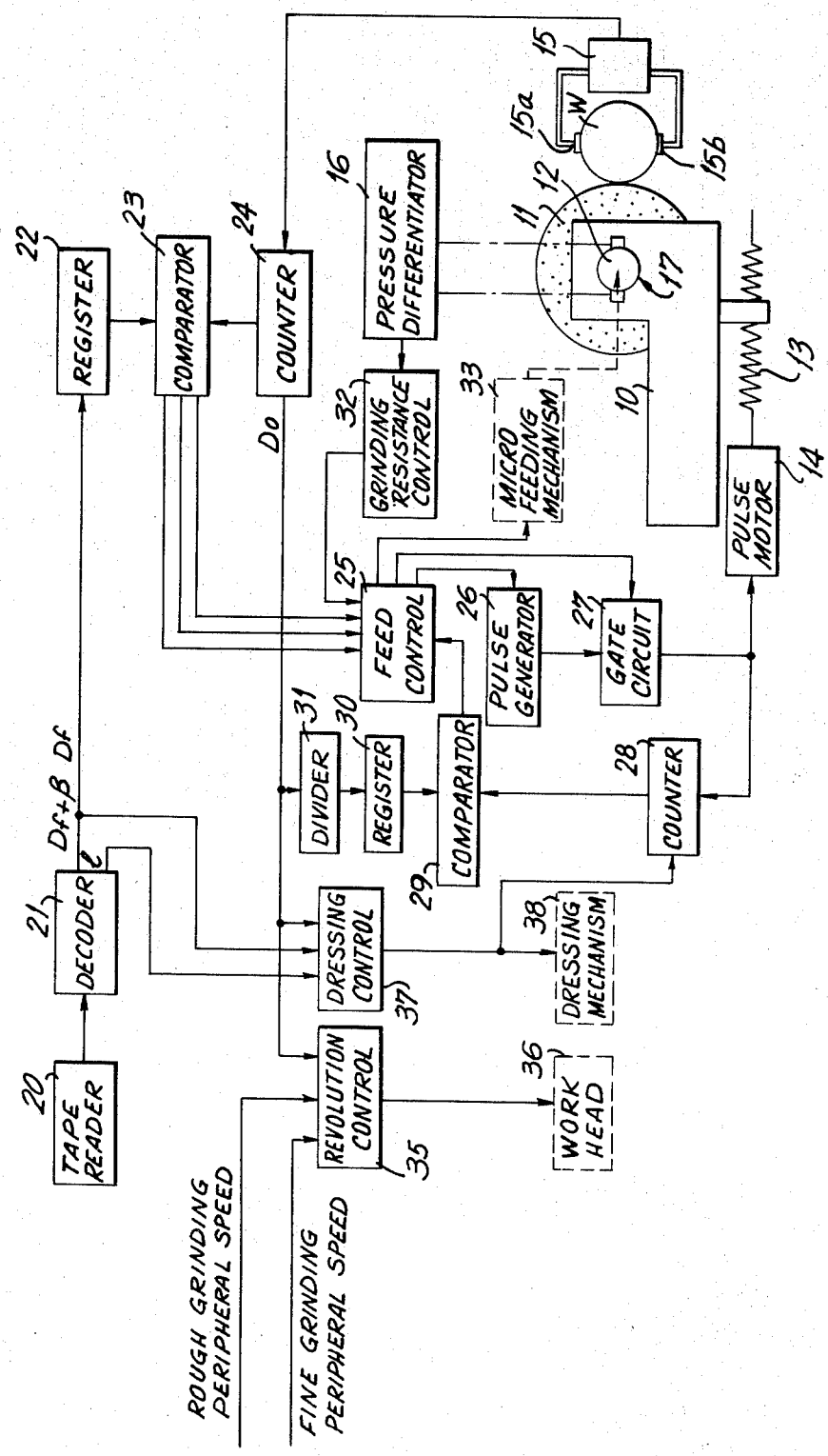
FIG. 1 is a block diagram of control system applied to a grinding machine according to the present invention.
Figure 2:
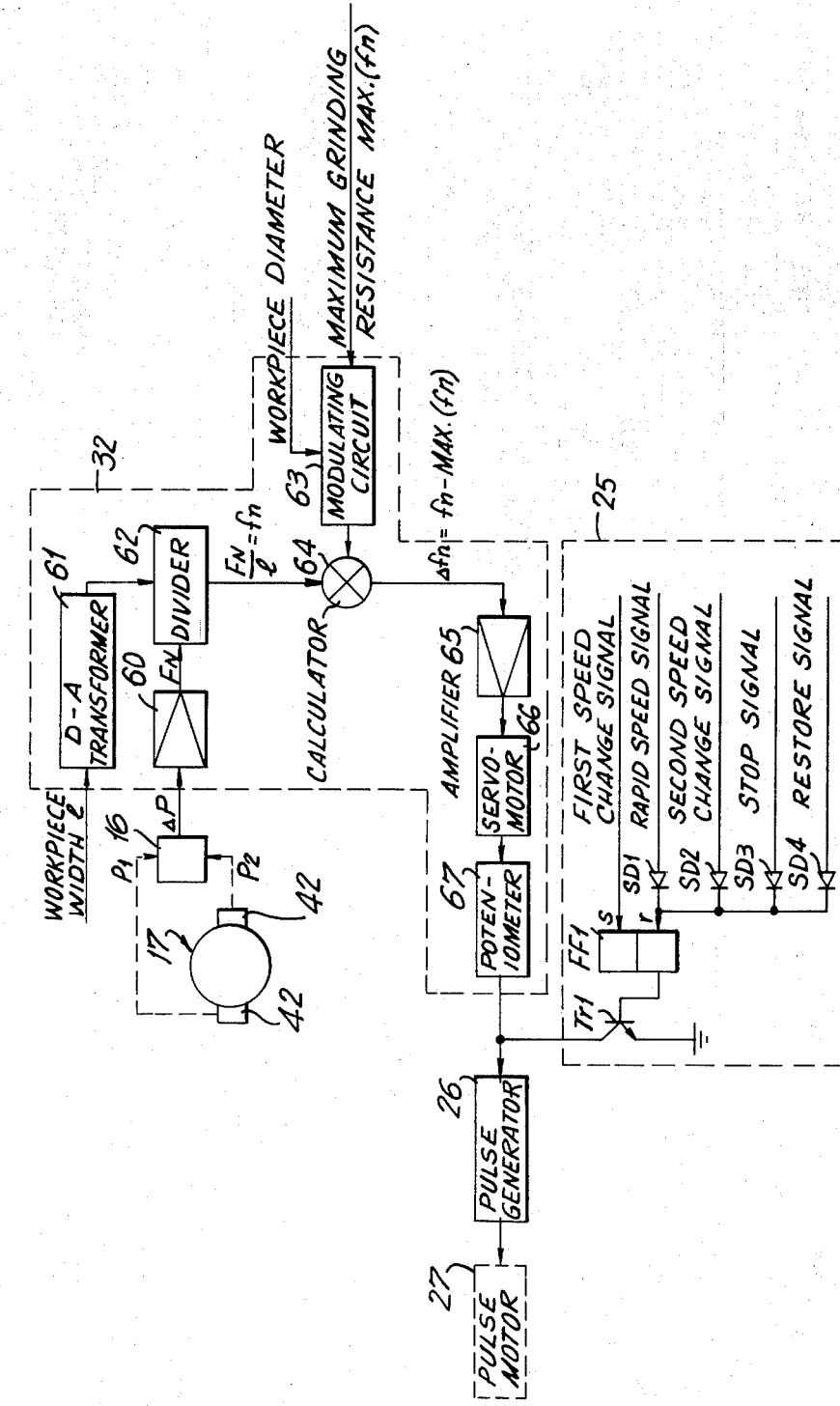
FIG. 2 is a block diagram showing a concrete system for controlling the grinding resistance on a workpiece.
Figure 3:
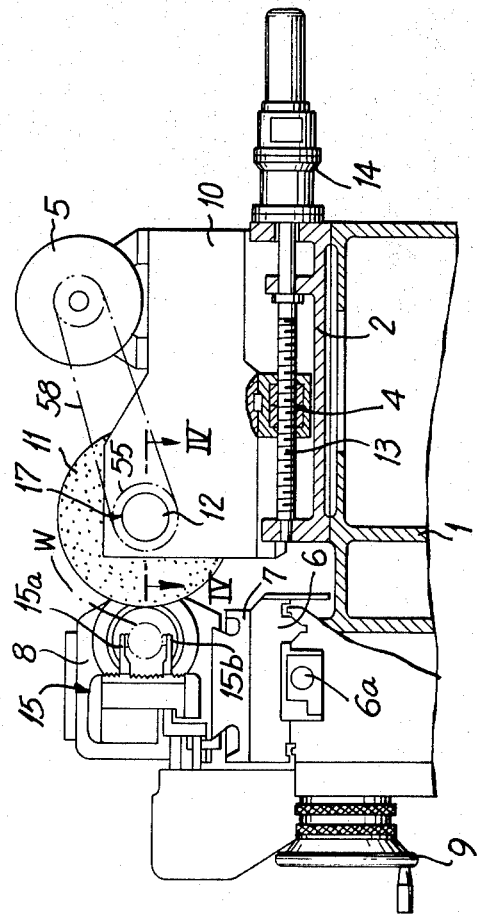
FIG. 3 is a view showing a grinding machine applied with the present invention, partly in section.

Referring now to FIGS. 1–3, numeral 10 indicates a wheel slide wherein a wheel spindle 12 for supporting a grinding wheel 11 is rotatably carried by means of hydraulic bearings 17. A feed screw 13 is threadedly engaged with the wheel slide 10 so that a pulse motor 14 fixed to the feed screw 13 moves the wheel slide 10 toward and from a workpiece W. A sizing device 15, which sizes the diameter of workpiece W, is provided with a pair of feelers 15a and 15b and an electric measuring device for measuring the distance between the feelers. The details of the sizing device will be discussed later.

The grinding resistance applied at the grinding wheel 11, which performs a grinding operation on the workpiece may be detected by a pressure differentiator 16 which is responsive to the pressure differential produced at pressure pockets of the hydraulic bearings 17, the pressure differential being proportional to the grinding resistance.

A tape reader 20 senses an information tape (not shown) on which input data are stored and discriminated by a decoder 21. Numeral 22 indicates a register to record the input data which comprises a changing value ($D_f + \beta$) for changing the feeding speed of the wheel slide 10 into a fine grinding speed, and a workpiece diameter $D_f$ to be obtained by the grinding operation. A counter 24 represents the workpiece diameter in digital numeration, since the workpiece diameter is sized by the sizing device 15 and changed from analogue value to digital value therein and thereafter furnished to the counter 24. A comparator 23 compares the digital numbers supplied from register 22 and counter 24, and supplies a control signal to a feed control 25 in accordance with the result of the comparison. The feed control 25 determines the feeding movement of the wheel slide 10 and effectuates two main functions, one of which is to change the feeding speed of wheel slide 10 at predetermined positions so as to obtain the grinding cycle shown in FIG. 10 or 12, and the other of which is variable to change the feeding speed in order to maintain the grinding resistance at a required or adaptive value.

In the embodiment according to the present invention, the two main functions above referred to are obtained by changing the frequency of electric pulses generated by a pulse generator 26. A gate circuit 27 controls the passage of the electric pulses of regulated frequency to the pulse motor 14. A counter 28 counts the number of electric pulses supplied to the pulse motor 14, and subtracts the value or number preset in digital form therein every time when an electric pulse is supplied to the pulse motor, and thus, indicates the current position of the grinding surface of grinding wheel 11 with respect to the axis of the workpiece w. A register 30 records the half diameter (radius) of the workpiece W at unfinished time. A comparator 29 serves to compare the content (value) in counter 28 with the recorded value on the register 30. When both values in the counter 28 and the register 30 coincide with each other, or the value in the counter 28 becomes slightly larger than that of the register 30, the comparator 29 supplies the feed control 25 with a coincidence signal so that the feed speed of the wheel slide 10 is changed from a higher to a lower value. A grinding resistance control 32, responsive to the pressure differentiator 16 furnishes a control signal to the feed control 25 in accordance with the pressure differential detected by the pressure differentiator 16.

A micro feeding mechanism 33 controls the position of the axis of wheel spindle 12 so as to move the grinding wheel 11 slightly toward the workpiece W by changing the pressures in opposing pressure pockets. The micro feeding mechanism 33 is utilized to grind the workpiece slightly after a sparkout operation. Numeral 35 indicates a revolution control for the workpiece W which calculates the peripheral speed of workpiece W depending upon the workpiece diameter measured by the sizing device 15 and controls a work head 36 so as to maintain a peripheral speed thereof at a required value. Numeral 37 indicates a dressing control, which directs the time when the dressing operation is to be effectuated, calculates a removal volume by the information supplied thereto, comprising the unfinished workpiece diameter Do, the finished workpiece diameter $D_f$ and width to be ground $l$, and supplies a dressing signal to a dressing mechanism 38, when the total removed volume attains a predetermined value. Since the radius of the grinding wheel 11 is reduced by the dressing operation, the current value on the counter 28 is changed by the reduced amount.

The detailed arrangement of the grinding machine, to which the control system according to the present invention is applied, is described hereinafter. Referring now to FIG. 3, a slide base 2 is fixed on a bed 1. Rotatably mounted on the slide base 2 is the feed screw 13 to one end of which the pulse motor 14 is secured. The feed screw 13 is threadedly engaged with a nut 4 depending from the underside of the wheel slide 10, whereby as the feed screw 13 is rotated, the wheel slide 10 is reciprocated on slideways formed on the slide base 2. The wheel spindle 12 for supporting the grinding wheel 11 is rotatably carried on the wheel slide 10 by means of hydraulic bearings 17. One end of the wheel spindle 12 is connected to a drive motor 5 on the wheel slide through a V-grooved pulley 55 and V-belts 58. Slidably mounted on the bed 1 in perpendicular relationship with respect to the grinding wheel 11 is a work table 6, on which a swivel table 7 is pivotably mounted. Furthermore, a head stock 8 and foot stock (not shown) are mounted on the swivel table 7 to support the workpiece W. Various mechanisms may be used as a feeding mechanism 6a for the work table 6. However, in this embodiment, a feed screw and an associated pulse motor are employed. The sizing device 15 for measuring the diameter of workpiece W is supported by the bed 1, and movable in a horizontal direction. Numeral 9 indicates a hand wheel for the work table 6.

Figure 4:
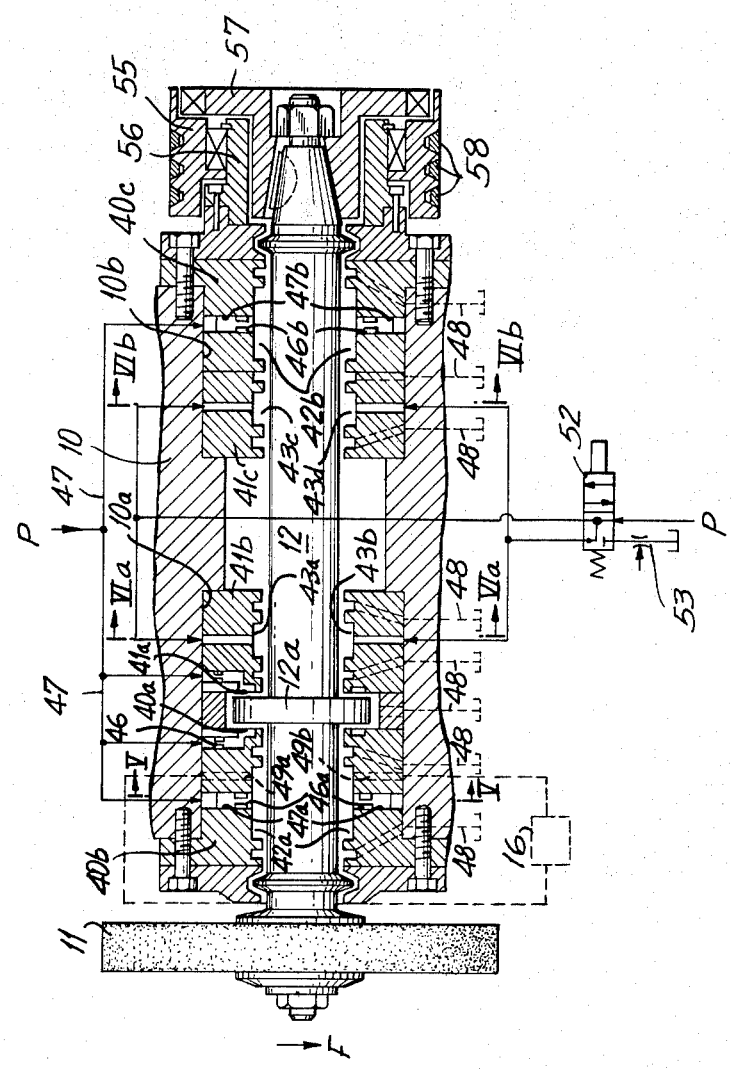
FIG. 4 is a sectional view taken along the line IV—IV in FIG. 3 and a hydraulic circuit is schematically attached thereto.
Figure 5:
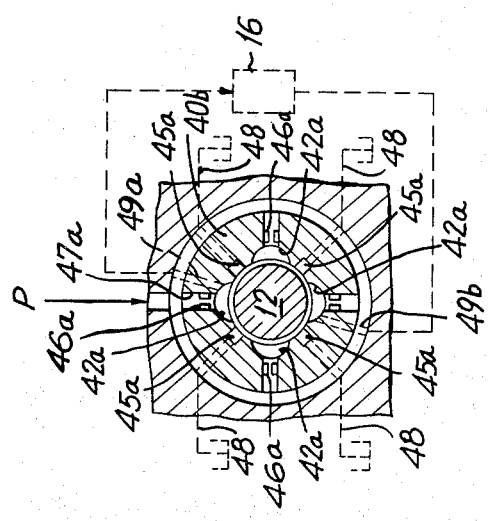
FIG. 5 is a sectional view taken along the line V—V in FIG. 4.

Referring to FIG. 4, in the wheel slide 10, bores 10a and 10b are formed, into which a pair of bearings 40b, 40c are fixedly inserted and provided respectively with bearing pockets 42a and 42b therein. A pair of bearings 41b and 41c are inserted into the bores 10a and 10b and are provided respectively with opposing pockets 43a, 43b and 43c, 43d for providing the displacement of the wheel spindle 12. The grinding wheel spindle 12 is supported by the bearings 40b, 40c, 41b and 41c and provided with a radial enlargement 12a which faces the side surfaces of the bearings 40b and 41b, and providing small clearances therebetween The side surfaces of the bearings 40b and 41b are respectively provided with annular grooves 40a and 41a leading from fluid supply lines 47 having restrictors 46. Supply conduits 47a and 47b, which are respectively provided with restrictors 46a and 46b therein are connected to the respective bearing pockets 42a and 42b in the bearings 40b and 40c. An axially extended groove 45a is provided for evacuating hydraulic fluid between every two adjacent bearing pockets 42a. While four such grooves 45a are shown in FIG. 5 it will be understood that the number of the grooves are not specifically limited as to number. The bearing 40c is also provided with axially extended grooves (not shown) which are substantially identical with the grooves 45a.

Since the grinding wheel 11 is fed into the workpiece W in a horizontal direction, in other words, the wheel spindle 12 is displaced in the horizontal direction in proportional relationship to the grinding resistance, a pair of radial conduits 49a and 49b are horizontally extended in the bearing 40b and connected to a pair of bearing pockets 42a which are opposed to each other in a horizontal direction, the conduits 49a and 49b introducing the pressures at the opposed bearing pockets 42a to the pressure differentiator 16. The pressure pockets 43a and 43b are formed on the bearing surface of the bearing 41b in an opposing relationship with each other and in a horizontal direction. The pressure pockets 43c and 43d are also formed on the bearing surface of the bearing 41c in an opposing relationship with each other and in a horizontal direction. The pockets 43a, 43b, 43c and 43d are respectively connected to conduits 50a, 51b, 50c and 51d which are connected to a change-over valve 52.

In the normal conditions each of the conduits 50a, 51b, 50c and 51b is connected to the change-over valve 52 as shown in FIG. 4, and the pressure pockets 43a and 43b are connected through the clearance between the wheel spindle 12 and the bearing 41b as are the pressure pockets 43c and 43d. Therefore, the pressures in all the pressure pockets are equalized, whereby the wheel spindle 12 is positioned at the center of the bearings.

Figure 6:
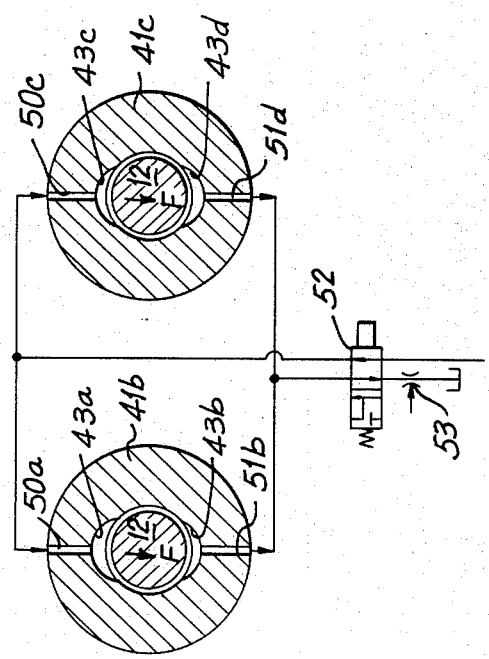
FIG. 6 comprises a sectional view taken along the lines VIa—VIa and VIb—VIb in FIG. 4, and showing the bearing arrangement to impart the displacement to a wheel spindle.

When the change-over valve 52 is shifted into the position shown in FIG. 6, the pressurized fluid is supplied through the conduits 50a, 50c to the pressure pockets 43a, 43c and evacuated from the pressure pockets 43b, 43d through a variable throttle valve 53 whereby a pressure differential is produced between the pockets 43a and 43b and between the pockets 43c and 43d resulting in the displacement of the wheel spindle 12 in the direction shown by an arrow F. The distance of the displacement of the wheel spindle 12 is controlled by the variable throttle valve 53. In the event a plurality of variable throttle valves are provided to control the displacement of the wheel spindle 12, the displacement may be controlled by substituting the throttle valves utilized, one for another. In case a single variable throttle value is provided as described and shown in FIGS. 4 and 6, the degree of displacement of the wheel spindle 12 may be controlled by changing the degree of throttling.

The V-grooved pulley 55 is rotatably mounted on a supporting cylinder 56 secured to the wheel slide 10 and engaged with a driving piece 57 fixed to the wheel spindle 12, whereby the wheel spindle 12 is not deviated by the tension of the V-belts 58 and is not vibrated by the vibration of the V-grooved pulley 55.

The pressure differentiator 16, which is responsive to the pressure differential and generates an electric signal proportional thereto, comprises a diaphragm responsive to the pressure differential and semi-conductor transducers which are attached to the diaphragm and changes the strain thereof into electric voltage. The output signal of the pressure differentiator 16 is furnished to the grinding resistance control 32, and thus the grinding resistance control controls the pulse generator 26 in accordance with the electric signal from the pressure differentiator 16, Referring now to FIG. 2, numeral 60 indicates an amplifier to amplify the output signal of the pressure differentiator 16. Numeral 61 indicates a D–A transformer to change the digital number of the width $l$ to the analogue number. Numeral 62 indicates a divider which divides the output $F_N$ of the amplifier 60, representing the grinding resistance, by the width $l$ so as to calculate the grinding resistance per unit of width. The grinding resistance per unit of width is hereinafter referred to as a unit resistance fn. Numeral 63 indicates a modulating circuit for modulating the maximum grinding resistance Max (fn) in accordance with the workpiece diameter D. Numeral 64 indicates a calculator which calculates the difference $\Delta fn$ between unit resistance fn and the maximum resistance Max (fn). The resistance value of a potentiometer 67 is controlled by a servomotor 66 in accordance with the difference $\Delta fn$ which has been amplified by an amplifier 65. The potentiometer 67 is operably connected to the pulse generator 26 and controls the frequency of the electric pulses generated thereby. A transistor Tr1, which is a part of the feed control 25, is connected to the input terminal of the pulse generator 26 and serves to make the potentiometer control on the pulse generator 26 effective or ineffective so that the transistor Tr1 is switched on or off by means of the flip-flop FF1. A set terminal S of the flip-flop FF1 is supplied with a first speed change signal from the comparator 23, and a reset terminal r thereof is supplied with rapid speed signal, a second speed change signal, a stop signal and a restore signal through respective diodes SD1, SD2, SD3 and SD4. When the reset terminal r is supplied with a signal, the transistor TR1 is switched off or cut off and thus the potentiometer control on the pulse generator 26 becomes effective and the pulse generator generates electric pulses to maintain the maximum resistance.

Another embodiment for setting the grinding resistance is described with reference to FIG. 14. According to the embodiment described in reference to FIG. 2, the grinding resistance is set at a constant value, but it is preferable to change the grinding resistance in accordance with the removal material left on the workpiece W in order to remove an affected zone on the workpiece due to the grinding operation. In the embodiment shown in FIG. 14, the grinding resistance is automatically changed in accordance with the difference between the present workpiece diameter and the finished diameter Df. In this particular embodiment of FIG. 14, the grinding resistance is determined to reduce the value along a line represented by a quadratic equation as shown in FIG. 15. Register 22a and counter 24a, which effectuate the same functions as register 22 and counter 24 shown in FIG. 1, record the finished diameter Df and unfinished diameter Do of the workpiece. The above mentioned diameter Do is one measured by the sizing device 15 and is reduced in accordance with the progress of the grinding operation on the workpiece W. A subtractor 70 calculates the difference between the contents in the counter 24a and register 22a. A D–A transformer 71 translates the difference (Do-Df) in digital form into an analogue number, and the translated number in the D–A transformer is self-multiplicated by a multiplier 72 to obtain $(Do-Df)^2$. An amplifier 74 multiplies the obtained $(Do-Df)^2$ by a multiplication number K. The output of the amplifier 74 is supplied to the modulating circuit 63 (shown in FIG. 2) and thus the grinding resistance is reduced in a required mode and in accordance with the reduction of the removal material left on the workpiece. It is to be appreciated that when the multiplication number K is changed, by taking the removal on the workpiece into consideration, the modulating circuit 63 may be preferably omitted.

Figure 14:
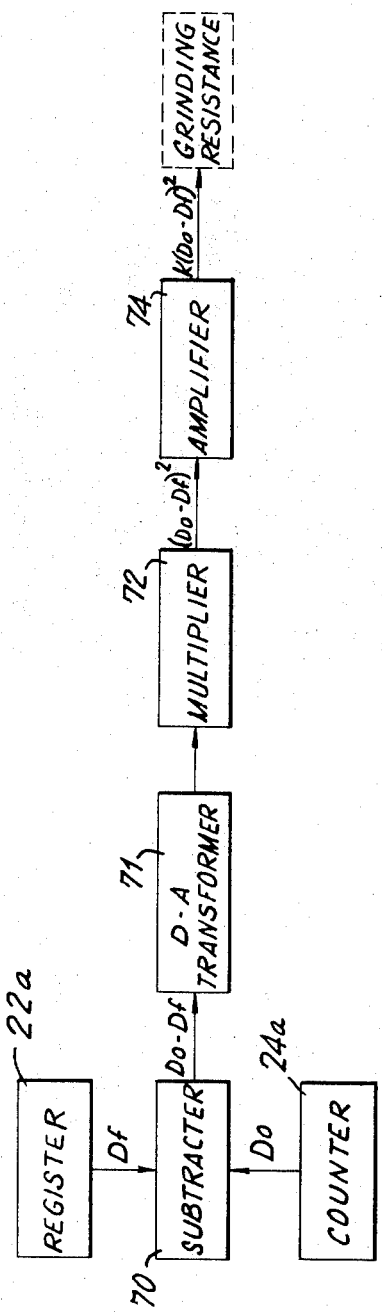
FIG. 14 is a block diagram showing another system for controlling the grinding resistance on a workpiece.
Figure 15:
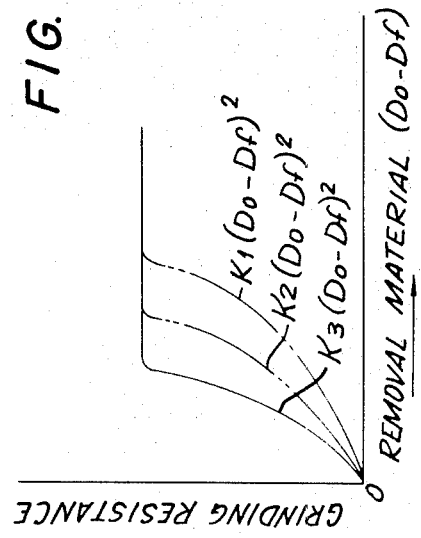
FIG. 15 is a diagram showing the grinding resistance when the system shown in FIG. 14 is applied.

The grinding resistance $K(Do-Df)^2$, which is determined through the system described with respect to FIG. 14, is reduced in accordance with the reduction of the removal material left on the workpiece W, i.e., in accordance with the mode represented by the quadratic equation as shown in FIG. 15. Accordingly, the affected zone on the workpiece due to the aforesaid grinding operation is effectively removed or reduced to a minimum value without sacrificing the machining efficiency.

Figure 8:
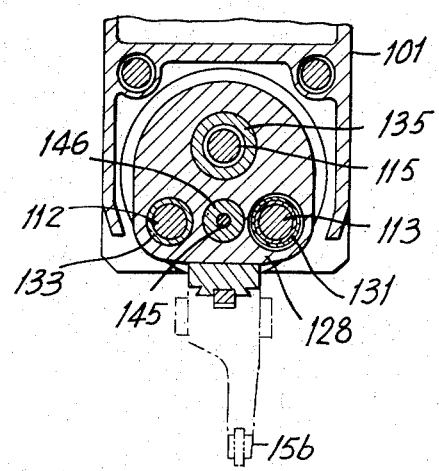
FIG. 8 is a sectional view taken along the line VIII—VIII in FIG. 7.
Figure 9:
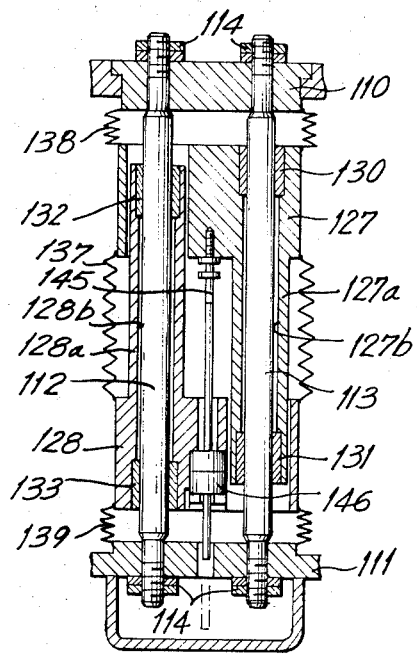
FIG. 9 is a sectional view taken along the line IX—IX in FIG. 7.

A sizing device 15 is illustrated in detail according to the showing of FIGS. 7 to 9. A housing 101 is pivotably mounted on a bracket 104 by means of a pin 105. The bracket 104 is connected to a pilot bar 102 and a piston rod 103 which is connected to a slidable piston of a hydraulic actuator (not shown). A plunger 107 is slidably mounted on the housing 101 at the lower end thereof and constantly urged toward the front surface of the bracket 104 by a compression spring 106, whereby the housing 101 has always imparted thereto a force to turn it in a counter-clockwise direction about the pivot pin 105. A screw 108 is threadedly engaged to the housing 101 and provided with an enlargement at the left end thereof (FIG. 7) to engage piece 109 secured to the bracket 104. The turning position of the housing 101 around the pivot pin 105 may be controlled by turning the screw 108. At the same time, the left end of the screw 108 is engaged with the operational lever of a limit switch LS1 which is fixed to the bracket 104, whereby the limit switch LS1 confirms the clockwise turn of the housing 101. The signal from the limit switch serves to open the electric circuit for a motor 122 which moves a pair of feelers 15a and 15b.

In front of the housing 101, there are provided with jaws 110 and 111 which supports a pair of pilot bars 112 and 113 both ends of which are connected thereto by ordinary nuts 114. A feed screw 115 is rotatably supported by the jaws 110 and 111. The axes of pilot bars 112, 113 and feed screw 115 are located to form a triangle as shown in FIG. 8. The feed screw 115 is provided with a righthanded screw portion 115R and lefthanded screw portion 115L in the vicinity of the upper and lower ends thereof and said feed screw is connected to the output shaft of the electric motor 122 secured to the housing 101 through the gear train of gears 116, 117, 118, 119, 120 and 121. Supporting blocks 127 and 128, which support the feelers 15a and 15b respectively, are slidably guided by the pilot bars 113 and 112 respectively. The supporting block 127 has a cylindrical portion 127a which extends downwardly and is provided with an inner bore 127b. At the upper and lower ends of the inner bore 127b, guide bushings 130 and 131 are press-fit to guide the supporting block 127 along the pilot bar 113. Similarly, the supporting block 128 is provided with a cylindrical portion 128a having an inner bore 128b, at both ends of which guide bushings 132, 133 are press-fit to guide the supporting block 128. The supporting blocks 127, 128 have, through bores 127c and 128c, a structure in which there are provided nuts 134, 135 which are threadedly engaged with the threaded portions 115R and 115L respectively of the feed screw 115.

The nut 134 is slidably mounted in the through bore 127c and restrained from rotation by an engaging pin 140 which is secured to the supporting block 127.

In the through bore 127c, there is interposed a compression spring 142 between the nut 134 and a stop ring 141 fixed to the supporting block 127. At the upper end of the through bore 127c, another stop ring 141b is fixed to the supporting block 127 to limit the upward movement of the nut 134. Accordingly, the compression spring 142 serves to cause the feelers 15a and 15b to contact the workpiece W with such pressure, so that the nut 134 may be moved with respect to the supporting block 127 in a vertical direction when the feed screw 115 is rotated by the motor 122 to move the feelers 15a and 15b toward the workpiece W. The feelers 15a and 15b are respectively connected to the supporting blocks 127 and 128 by means of a dovetail construction. A reference scale 145 depends from the supporting block 127 between the pilot bars 112 and 113 and a displacement detector 146, which is responsive to the movement of the reference scale, is provided in the supporting block 128 and co-axially arranged with respect to the reference scale 145. The displacement detector 146 detects the relative displacement between the upper and lower supporting blocks 127, 128, i.e., between the feelers 15a and 15b, and the detected displacement is changed into a digital number so that the diameter of the workpiece W is represented in digital numeration which is counted by the counter 24.

It is to be appreciated that the arrangement of the reference scale 145 and detector 146 is a well-known device, and other devices may be applicable to measure the mutual displacement of upper and lower supporting blocks 127 and 128.

A bellows 138, made of rubber, is attached to the upper end of the supporting block 127 and the lower end of the jaw 110. A bellows 139 is also provided between the jaw 111 and the supporting block 128. Furthermore, there is provided a bellows 137 between supporting blocks 127 and 128, whereby reference scale 145, displacement detector 146, pilot bars 112 and 113, and feed screw 115, etc., are covered so as to prevent the above-mentioned members from the damage caused by grinding grain and coolant, etc.

A limit switch LS2, which is operated when the feelers 15a and 15b are ultimately separated with each other, serves to open the electric circuit of the motor 122 when it is actuated by the lower supporting block 128. The feelers 15a and 15b are moved toward or from each other through feed screw 115 and the supporting blocks 127, 128, when the motor 122 is rotated in normal or reverse direction. In the event that the motor 122 is rotated in a reverse direction, the feelers 15a, 15b are moved toward each other, i.e., toward the workpiece W. Since the housing 101 has been slightly turned in a counter-clockwise direction by the force of the compression spring 106, the lower feeler 15b contacts the workpiece for the first time, and thereafter, the housing 101 is turned in a clockwise direction against the force of the compression spring 106 in accordance with the reverse rotation of the motor 122. When the screw 108 actuates the limit switch LS1 resulting in opening the electric circuit of the motor 122, thus stopping actuation thereof, the movement of the feelers is stopped; and at this time the upper feeler 15a is also contacted with the workpiece, and thus the supporting block 127 is moved with respect to the nut 134 against the force of the compression spring 142. Accordingly, the mutual displacement of the supporting blocks 127, 128 is detected by the measuring device comprising the reference scale 145 and the detector 146, and the detected displacement is changed, as described above, into a digital number, and thereafter the digital number is supplied to the counter 24 to represent the diameter of the workpiece W by comparing the initially preset number thereon.

In the case where the counter 24 is a subtracting counter, the position in the feelers 15a and 15b are ultimately spaced from each other, being considered as an original position of the feelers 15a and 15b. The ultimately spaced distance between the feelers is correctly measured and the measured distance is preset on the subtracting counter in digital numeration. Accordingly, the feelers are moved toward each other, i.e., toward the workpiece, the distance of movement is subtracted from the originally preset value, whereby the diameter of the workpiece is correctly represented and the error due to miscounting is not accumulated.

In the case where the counter 24 is a subtracting and adding counter, the original position of the feelers is determined at a most favorable position. When the feelers are located at the above mentioned most favorable position, the distance between the feelers is correctly measured and thus the measured distance is preset on the subtracting and adding counter in digital numeration. Accordingly, the diameter of workpiece is represented by adding to or subtracting from the preset value in accordance with the movement of the feelers 15a and 15b.

The operation of the above-mentioned embodiment is hereinafter described, the description being mainly concerned with the operation when the grinding resistance is constant. When the workpiece W is loaded on the grinding machine, the "start" button is pushed to operate the tape reader 20 to sense the tape (not shown), and to advance the sizing device 15 to the sizing position. The motor 122 for the sizing device 15 is actuated to approach the feelers 15a and 15b toward the workpiece W. When both feelers 15a and 15b are engaged with the workpiece W, the limit switch LS1 is actuated by means of the screw 108 to thereby stop the actuation of the motor 122. Meanwhile, the digital number, which exactly corresponds to the displacement of the feelers 15a and 15, is counted, and thus the diameter Do of the unfinished workpiece is denoted by the counter 24. Thereafter, the feed control 25 furnishes a signal to the pulse generator 26 so as to supply the high frequency pulses to the pulse motor 14 through the gate 27 whereby the wheel slide 10 is advanced toward the workpiece at a rapid speed. The electric pulses supplied to the pulse motor 14 are then counted by the counter 28. This counted number denotes the distance between the axis of the workpiece and the grinding surface of the grinding wheel 11 and is compared with the content on the register 30 by means of the comparator 29. It is to be recalled that the half of the unfinished workpiece diameter $Do/2$ is recorded on the register 30 by the aid of the divider 31. Accordingly, when the content of the counter 28 becomes equal to the half diameter $Do/2$, the grinding wheel 11 is engaged with the surface of the workpiece W. To avoid the collision of the workpiece W and the grinding wheel 11 at the time of rapid infeed speed of wheel slide 11, the comparator 29 issues a reducing signal when a predetermined small distance is left between the workpiece and the grinding wheel 11. By the aid of the reducing signal, the feed control 25 supplies a first speed changing signal to the pulse generator 26 to change the frequency of the pulse generator 26 from a high to a lower value. At the same time, the first speed changing signal is furnished to the set terminal S of the flip-flop FF1 and thus the transistor Tr1 is switched off, whereby the control of the potentiometer 67 is effective on the pulse generator 26. The output voltage of the potentiometer 67 is controlled by means of servo motor 66 which moves in accordance with the differential $\Delta fn$ between the actual grinding resistance detected by the differentiator 16 and the preset value on the grinding resistance control 32. Accordingly, the frequency of the electric pulses generated by the pulse generator 26 is changed, and thus the pulse motor 14 is automatically controlled so as to maintain the grinding resistance at the predetermined value. Meanwhile, according to the embodiment described above, referring to FIG. 14, the grinding resistance is reduced in accordance with the reduction of the material for removal left on the workpiece W, whereby the affected zone by the grinding operation is taken away or kept at a minimum amount. When the tape is read by the tape reader, the speed change diameter $D_f + \beta$, at which the infeed speed is changed from rough grinding speed to fine grinding speed, and the finished workpiece diameter $D_f$ are discriminated by the decoder 21 and both values $D_f + \beta$ and $D_f$ are registered on the register 22. When the diameter of the workpiece is reduced until $D_f + \beta$ under the control of the grinding resistance control 32, the content in the counter 24 also becomes $D_f + \beta$, and thus the comparator 23 supplies a second speed changing signal. With the second speed changing signal the feed control 25 stops to control the grinding resistance and change the frequency of electric pulses generated by the pulse generator 26 from the lower one to low and constant frequency for a fine grinding speed. In the fine grinding operation, the control of the grinding resistance is not effected, and the wheel slide 10 is advanced at low and constant speed. The diameter of the workpiece is measured during the fine grinding operation. When the diameter of the workpiece W is reduced to a predetermined value $D_f + \alpha$, $\alpha$ being far smaller than $\beta$ and being small enough for grinding operation by shifting the axis of wheel spindle 12, the comparator 23 supplies a stop signal to the feed control 25, whereby the feed control 25 closes the gate 27 to thereby stop the advancement of the wheel slide 10, and thereafter spark-out operation is effected on the workpiece W. After the spark-out operation for a predetermined period, the diameter of workpiece W is confirmed by the comparator 23. In case a required diameter $D_f$ is not obtained, the feed control 25 effects to change the connecting parts of the change-over valve 52 so that pressure differentials are produced between the pockets 43a, 43b and between the pockets 43c, 43d to thereby advance the wheel spindle 12 to grind the workpiece slightly. When the required diameter $D_f$ is still not obtained by shifting the axis of the wheel spindle 12 one time, the axis thereof is restored to the center of the bearings and the wheel slide 10 is advanced by the same amount ground by shifting the wheel spindle by supplying the electric pulses to the pulse motor 14, and thereafter the wheel spindle 12 is shifted in the same manner as before. When the diameter of the workpiece corresponds with the required value $D_f$, the comparator 23 supplies a restore signal to the feed control 25 and thus the gate is reversed so as to rotate the pulse motor 14 in a reverse and rapid speed to restore the wheel slide 11 to the original position thereof. While the wheel slide 11 is restored to the original point thereof, the distance between the surface of the grinding wheel and the axis of the workpiece is registered on the counter 28 for the next grinding operation. At the same time the motor 122 is actuated to restore the feelers 15a and 15b to the original position thereof. By the restoration of the feelers 15a and 15b, the grinding operation on the workpiece is finished. Thereafter, the workpiece W is unloaded and the next fresh workpiece W is loaded on the grinding machine, and the same operation as above-mentioned is repeated.

Figure 10:
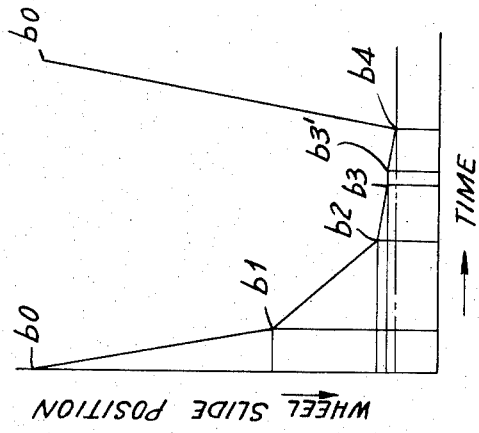
FIG. 10 is a diagram showing the cycle of grinding operation.
Figure 11:
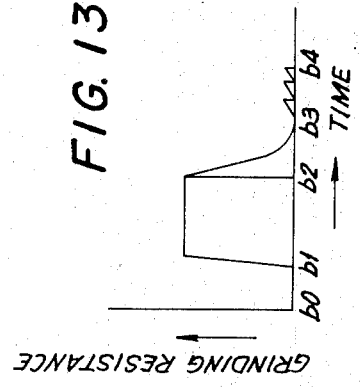
FIG. 11 is a diagram showing the grinding resistance applied on a grinding wheel, when a workpiece is ground in accordance with the grinding cycle shown in FIG. 10.

The grinding operation cycle is shown in FIG. 10. The wheel slide 10 is moved from the original point ao at a rapid feed speed. Each of the speed changing points $a1, a2, a3, a3'$ and $a4$ is decided by means of the sizing device 15. Between the points a1 and a2, the feeding speed of the wheel slide 10 is controlled in accordance with the grinding resistance and thus tolerable maximum speed for the machine and the workpiece may be chosen, whereby the machining efficiency is heightened. Furthermore, a speed change point $a1$, where the feed speed of the wheel slide 10 is changed from rapid speed to rough grinding speed, is controlled or decided by the sizing device 15, whereby the time consumed for air cutting is eliminated even if the workpieces are of uneven diameter, and resultantly, the total time required for the grinding operation is reduced. The affected zone on the workpiece, due to the heavy grinding, is effectively eliminated by the fine grinding operation and the spark-out operation. The high machining accuracy is obtained through fine grinding operation, spark-out operation and grinding operation by shifting the axis of the wheel spindle 12. FIG. 11 shows the grinding resistance when the grinding cycle shown in FIG. 10 is employed. The grinding resistance between points a1 and a2 is maintained at a high and constant value.

Figure 12:
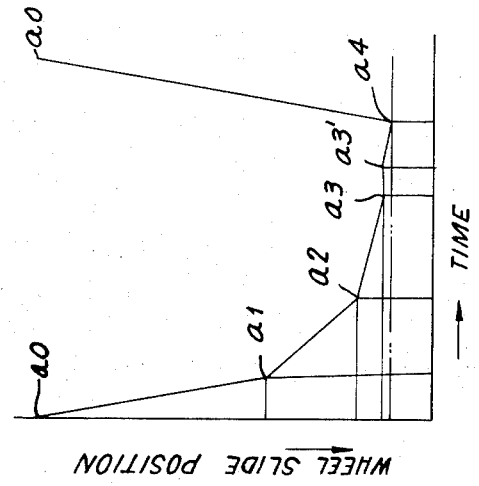
FIG. 12 is a diagram showing another cycle of grinding operation.
Figure 13:
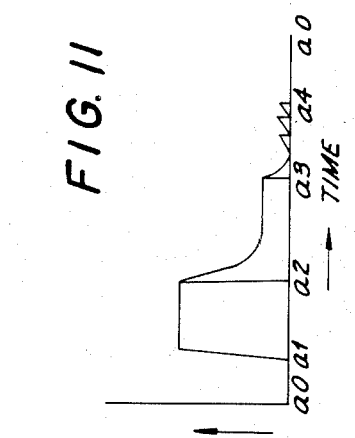
FIG. 13 is a diagram showing the grinding resistance applied on a grinding wheel, when a workpiece is ground in accordance with the grinding cycle shown in FIG. 12.

FIG. 12 shows another grinding cycle, in which a fine grinding operation is preferably omitted, i.e., after the rough grinding operation ($b1 - b2$), the spark-out operation ($b2 - b3'$) is performed to eliminate the affected zone on the workpiece and to increase the machining accuracy. In other words, with the heavy grinding operation under the grinding resistance control, the greatest part of the required material for removal is ground or taken away to increase the machining efficiency. However, when the grinding cycle shown in FIG. 12 is applied, the machining accuracy is lower than that of the grinding cycle shown in FIG. 10.

According to the present invention, the workpiece diameter is successively measured from the beginning to the end of the grinding operation, and the movement of the wheel slide 10 is controlled in accordance with the sizing device 15 to increase the machining accuracy. Furthermore, since the grinding operation is performed by detecting the diameter of the workpiece, the wheel slide 10 is advanced at a rough grinding speed until the removal on the workpiece is at a minimum, whereby the machining efficiency is remarkably increased. Accordingly, the machining efficiency is not only increased, but also the machining accuracy is increased compared with the conventional grinding operation.

What is claimed is:

1. A grinding machine comprising a bed, a work support slidably mounted on said bed and adapted to carry a workpiece thereon, a wheel slide slidably mounted on said bed and carrying thereon a rotatable wheel spindle having secured thereto a grinding wheel, feeding means for moving said wheel slide toward and away from said workpiece, sizing means capable of continuously measuring a diameter of the workpiece, grinding resistance detecting means for detecting a grinding resistance applied on said grinding wheel, and control means for controlling said feeding means in response to said grinding resistance detecting means to control said grinding resistance during a part of grinding operation and for controlling said feeding means in response to said sizing means during the remaining grinding operation.

2. A grinding machine as claimed in claim 1, wherein said control means is adapted to control said feeding means in response to said grinding resistance detecting means to control said grinding resistance during a rough grinding operation.

3. A grinding machine as claimed in claim 1, wherein said control means is adapted to control said feeding means in response to said grinding resistance detecting means to maintain said grinding resistance substantially constant during said part of grinding operation.

4. A grinding machine as claimed in claim 1, wherein said control means is adapted to control said feeding means in response to said grinding resistance detecting means to reduce said grinding resistance in accordance with the reduction of the removal material left on the workpiece.

5. A grinding machine comprising a bed, a work support slidably mounted on said bed and adapted to carry a workpiece thereon, a wheel slide slidably mounted on said bed and carrying thereon a rotatable wheel spindle having secured a grinding wheel thereto, feeding means including a pulse motor for moving said wheel slide toward and away from said workpiece, a pulse generator for supplying electric pulses generated thereby to said feeding means, sizing means capable of continuously measuring a diameter of the workpiece, grinding resistance detecting means for detecting a grinding resistance applied on said grinding wheel, and feed control means for controlling the frequency of the electric pulses generated by said pulse generator in response to said grinding resistance detecting means to control said grinding resistance during a part of grinding operation and for controlling the frequency of the electric pulses in response to said sizing means during the remaining grinding operation.

6. A grinding machine as claimed in claim 5, wherein said feed control means is adapted to control the frequency of the electric pulses in response to said grinding resistance detecting means to control said grinding resistance during a rough grinding operation.

7. A grinding machine as claimed in claim 5, wherein said grinding machine further comprises means for calculating a differential between a required value of the workpiece and a value thereof measured by said sizing means to supply a signal to said feed control means to control said feeding means.

8. A grinding machine as claimed in claim 7, wherein said calculating means supplies the signal to said feed control means to render the control of said grinding resistance detecting means ineffective to stop the part of grinding operation.

9. A grinding machine as claimed in claim 5, wherein said grinding machine further comprises means for calculating a differential between a required value of the workpiece and a valve thereof measured by said sizing means, and position coding means responsive to said sizing means and said electric pulses supplied to said feeding means, said position coding means being operable to supply a signal to change the speed of said wheel slide before engagement between the grinding wheel and the workpiece.

10. A grinding machine as claimed in claim 9, wherein said position coding means comprises register means, responsive to said calculating means, counting means for counting the number of said electric pulses supplied to said feeding means, and comparing means responsive to said register means and said counting means for supplying said signal so that said control means changes the frequency of said electric pulses.

11. A grinding machine as claimed in claim 5, wherein said grinding resistance detecting means comprises bearing means for carrying said wheel spindle and provided with pockets therein, transducing means for producing a signal in accordance with a pressure differential produced at said pockets, and resistance control means responsive to said signal produced by said transducing to control the number of said electric pulses generated by said pulse generator.

12. A grinding machine as claimed in claim 11, wherein said bearing means is further provided with at least one pair of pockets diametrically opposed in the direction of the movement of the wheel slide, and means is provided for producing a pressure differential between said pair of pockets to shift the wheel spindle toward the workpiece, whereby the workpiece is ground to a required value.

13. A grinding machine as claimed in claim 11, wherein said resistance control means comprises means responsive to said transducing means and for calculating a grinding resistance per unit of width applied on said grinding wheel, means for presetting a preset grinding resistance means for calculating a differential between said grinding resistance per unit of width and said preset grinding resistance, and means responsive to said last named means and for supplying said control signal to said feed control means to control the number of said electric pulses generated by said pulse generator, thereby to maintain the grinding resistance applied on said grinding wheel at said preset grinding resistance.

14. A grinding machine as claimed in claim 13 wherein said resistance control means further comprises means for reducing said preset grinding resistance in accordance with the reduction of removal left on the workpiece and which comprises means for calculating a differential between a required value of the workpiece and a value thereof measured by said sizing means.

15. A grinding machine as claimed in claim 5, wherein said sizing means comprise a bracket movably mounted on said bed, a housing pivotably mounted on said bracket, an electric motor mounted on said housing, feed screw means adapted to be rotated by said motor, a pair of nuts threadedly engaged with said screw means, a pair of feelers arranged to embrace the workpiece and connected to said feed screw means through said nuts, spring means interposed between the nut and the feeler to render relative movement therebetween, and means for measuring the distance between said feelers.

16. A grinding machine as claimed in claim 15, wherein said sizing means further comprises switching means for effectuating the confirmation of pivotal movement of said housing when said feelers are moved by said electric motor, whereby the actuation of said electric motor is stopped.

17. A grinding machine comprising a bed, a work support slidably mounted on said bed and adapted to carry a workpiece thereon, a wheel slide slidably mounted on said bed and carrying a rotatable grinding wheel thereon, electrically controlled feeding means for moving said wheel slide toward and from said workpiece, sizing means capable of measuring a diameter of the workpiece, control means responsive to said sizing means and operable to control the frequency of electric pulses generated by a pulse generator, and position coding means responsive to said sizing means and said electric pulses supplied to said feeding means, said position coding means being operable to supply a signal to said control means to change the speed of said wheel slide before engagement between the grinding wheel and the workpiece.

18. A grinding machine as claimed in claim 17, wherein said position coding means comprises register means responsive to said sizing means, means for counting the number of said electric pulses supplied to said feeding means and comparing means responsive to said register means and said counting means and for supplying a signal so that said control means changes the frequency of said electric pulses.

19. A grinding machine as claimed in claim 17, wherein said grinding machine further comprises grinding resistance detecting means for detecting a grinding resistance applied on said grinding wheel and for supplying said control means with a signal in accordance with the grinding resistance to control the grinding resistance.

20. A grinding machine as claimed in claim 19, wherein said control means capable of controlling said feeding means to control the grinding resistance in accordance with the detected grinding resistance by changing the feed rate of the said wheel slide.

21. A grinding machine comprising a bed, a work support slidably mounted on said bed and adapted to carry a workpiece thereon, a wheel slide slidably mounted on said bed, bearing means mounted in said wheel slide for rotatably carrying a wheel spindle having a grinding wheel secured thereto, said bearing means being formed with pockets therein, fluid-pressure means communicating with said pockets, feeding means for moving said wheel slide toward and away from said workpiece, transducing means operative to generate a signal proportional to a pressure differential produced in said fluid-pressure means in said pockets, and control means for controlling said feeding means in response to said transducing means to maintain the grinding resistance applied on said grinding wheel at a predetermined value.

22. A grinding machine comprising a bed, a work support slidably mounted on said bed and adapted to carry a workpiece thereon, a wheel slide slidably mounted on said bed, bearing means mounted in said wheel slide for rotatably carrying a wheel spindle having a grinding wheel secured thereto, said bearing means being formed with pockets therein, fluid-pressure means communicating with said pockets, feeding means for moving said wheel slide toward and away from said workpiece, transducing means operative to generate a signal proportional to a pressure differential produced in said fluid pressure means in said pockets, means responsive to said transducing means for calculating a grinding resistance per unit of width applied on said grinding wheel, means for presetting a selected grinding resistance, means for calculating a differential between said grinding resistance per unit of width and said selected grinding resistance, and control means for controlling said feeding means in response to said differential calculated by said calculating means to maintain the grinding resistance per unit of width at said selected grinding resistance.

\* \* \* \* \*